(12) United States Patent
Amento et al.

(10) Patent No.: US 8,621,098 B2
(45) Date of Patent: Dec. 31, 2013

(54) METHOD AND APPARATUS FOR PROVIDING MEDIA CONTENT USING A MOBILE DEVICE

(75) Inventors: Brian Amento, Morris Plains, NJ (US); Alicia Abella, Morristown, NJ (US); Larry Stead, Upper Montclair, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 90 days.

(21) Appl. No.: 12/635,119

(22) Filed: Dec. 10, 2009

(65) Prior Publication Data

US 2011/0145427 A1 Jun. 16, 2011

(51) Int. Cl.
*G06F 15/16* (2006.01)

(52) U.S. Cl.
USPC .............. 709/231; 709/200; 709/232; 455/74

(58) Field of Classification Search
USPC ...................... 709/200, 231, 232, 233; 455/74
See application file for complete search history.

(56) References Cited

U.S. PATENT DOCUMENTS

| | | | |
|---|---|---|---|
| 5,585,952 A * | 12/1996 | Imai et al. ..................... 398/103 |
| 6,108,560 A * | 8/2000 | Navaro et al. ................. 455/517 |
| 6,285,659 B1 * | 9/2001 | Feuerstraeter et al. ....... 370/244 |
| 6,446,125 B1 * | 9/2002 | Huang et al. .................. 709/226 |
| 6,594,699 B1 * | 7/2003 | Sahai et al. ................... 709/228 |
| 7,315,886 B1 * | 1/2008 | Meenan et al. ............... 709/219 |
| 7,418,472 B2 * | 8/2008 | Shoemaker et al. .......... 709/203 |
| 7,656,849 B1 * | 2/2010 | Evans ........................... 370/338 |
| 7,783,771 B2 * | 8/2010 | Pantalone ..................... 709/230 |
| 7,808,988 B2 * | 10/2010 | Neff ............................. 370/389 |
| 7,809,846 B2 * | 10/2010 | Chou et al. ................... 709/230 |
| 7,903,652 B2 * | 3/2011 | Huang et al. ................. 370/390 |
| 7,921,150 B1 * | 4/2011 | Schwartz ...................... 709/201 |
| 8,060,627 B2 * | 11/2011 | Rosenblatt et al. .......... 709/228 |
| 8,386,587 B2 * | 2/2013 | Sagar et al. ................... 709/217 |
| 2001/0052019 A1 * | 12/2001 | Walters et al. ................ 709/231 |
| 2003/0037033 A1 * | 2/2003 | Nyman et al. ..................... 707/1 |
| 2004/0121792 A1 * | 6/2004 | Allen et al. ................... 455/519 |
| 2004/0204071 A1 * | 10/2004 | Bahl et al. .................... 455/557 |
| 2005/0246451 A1 * | 11/2005 | Silverman et al. ........... 709/231 |
| 2007/0038773 A1 * | 2/2007 | White et al. .................. 709/233 |
| 2007/0162945 A1 * | 7/2007 | Mills ............................ 725/119 |
| 2007/0178918 A1 * | 8/2007 | Shon ............................ 455/466 |
| 2007/0183342 A1 * | 8/2007 | Wong et al. .................. 370/252 |
| 2007/0183344 A1 * | 8/2007 | Joshi ............................ 370/254 |
| 2007/0189275 A1 * | 8/2007 | Neff ............................. 370/352 |
| 2007/0280286 A1 * | 12/2007 | Hodson et al. ............... 370/466 |
| 2008/0056145 A1 * | 3/2008 | Woodworth .................. 370/252 |
| 2008/0085682 A1 * | 4/2008 | Rao ................................ 455/74 |
| 2008/0109317 A1 * | 5/2008 | Singh ............................. 705/14 |
| 2008/0115185 A1 * | 5/2008 | Qiu et al. ..................... 725/118 |
| 2008/0160911 A1 * | 7/2008 | Chou et al. ...................... 455/7 |
| 2008/0182591 A1 * | 7/2008 | Krikorian ................. 455/456.3 |
| 2008/0183854 A1 * | 7/2008 | Hopen et al. ................. 709/223 |
| 2008/0189429 A1 * | 8/2008 | DaCosta ....................... 709/231 |
| 2008/0195749 A1 * | 8/2008 | Krig ............................. 709/232 |
| 2008/0313278 A1 * | 12/2008 | Hochberg .................... 709/204 |

(Continued)

*Primary Examiner* — Anthony Mejia (57) ABSTRACT

A method and an apparatus for providing media content using a mobile device as a media server. For example, the method discovers at least one target mobile device, and determines whether the at least one target mobile device is capable of supporting wireless streaming media. The method streams the media content to the at least one target mobile device using the mobile device if the at least one target mobile device is determined to be capable of supporting wireless streaming media.

9 Claims, 4 Drawing Sheets

(56) References Cited

U.S. PATENT DOCUMENTS

| | | | |
|---|---|---|---|
| 2009/0011748 A1* | 1/2009 | Hotta | 455/414.3 |
| 2009/0024757 A1* | 1/2009 | Proctor | 709/232 |
| 2009/0034935 A1* | 2/2009 | Putterman et al. | 386/83 |
| 2009/0055377 A1* | 2/2009 | Hedge et al. | 707/5 |
| 2009/0172083 A9* | 7/2009 | Fillebrown et al. | 709/203 |
| 2009/0187486 A1* | 7/2009 | Lefenfeld et al. | 705/14 |
| 2009/0187957 A1* | 7/2009 | Avkarogullari | 725/109 |
| 2009/0288138 A1* | 11/2009 | Kalofonos | 726/2 |
| 2009/0305694 A1* | 12/2009 | Zheng et al. | 455/426.1 |
| 2009/0319663 A1* | 12/2009 | Giles et al. | 709/226 |
| 2010/0005187 A1* | 1/2010 | Breiter et al. | 709/231 |
| 2010/0007711 A1* | 1/2010 | Bell | 348/14.02 |
| 2010/0027565 A1* | 2/2010 | Gupta et al. | 370/475 |
| 2010/0043056 A1* | 2/2010 | Ganapathy | 726/2 |
| 2010/0062712 A1* | 3/2010 | Lakshmanan | 455/41.2 |
| 2010/0088359 A1* | 4/2010 | Phillips et al. | 709/203 |
| 2010/0138854 A1* | 6/2010 | Lee et al. | 725/25 |
| 2010/0146092 A1* | 6/2010 | Hu et al. | 709/223 |
| 2010/0149301 A1* | 6/2010 | Lee et al. | 348/14.08 |
| 2010/0153985 A1* | 6/2010 | Dey | 725/25 |
| 2010/0154023 A1* | 6/2010 | Dey | 725/151 |
| 2010/0223673 A1* | 9/2010 | Scott et al. | 726/28 |
| 2010/0235525 A1* | 9/2010 | McGuire et al. | 709/228 |
| 2010/0255781 A1* | 10/2010 | Wirola et al. | 455/41.2 |
| 2010/0268783 A1* | 10/2010 | Mizosoe et al. | 709/206 |
| 2010/0283624 A1* | 11/2010 | Krueger | 340/825 |
| 2010/0284386 A1* | 11/2010 | Ulupinar et al. | 370/338 |
| 2010/0299308 A1* | 11/2010 | Prasad et al. | 707/622 |
| 2010/0312833 A1* | 12/2010 | Rimmer et al. | 709/204 |
| 2011/0010459 A1* | 1/2011 | Stokking et al. | 709/231 |
| 2011/0035432 A1* | 2/2011 | Hsiung et al. | 709/203 |
| 2011/0099218 A1* | 4/2011 | Schwartz | 709/201 |
| 2012/0131218 A1* | 5/2012 | Putterman et al. | 709/231 |
| 2012/0243524 A1* | 9/2012 | Verma et al. | 370/338 |

* cited by examiner

METHOD AND APPARATUS FOR PROVIDING MEDIA CONTENT USING A MOBILE DEVICE

The present invention relates generally to communication networks and, more particularly, to a method and apparatus for providing media content using a mobile device as a mobile media server over a network, e.g., an Internet Protocol (IP) Multimedia Subsystem (IMS) network, a Voice over Internet Protocol (VoIP) network, a wireless network, and the like.

BACKGROUND OF THE INVENTION

In a traditional networking environment, content is provided by large network operators. For example, broadcast television operators send video content to be viewed by end users via television (TV) sets. In order to allow the end users to have some choices, the broadcast network operator typically broadcasts on several channels. However, the content in each channel is selected to be desirable for a large audience, e.g., potentially millions of end users. Hence, content that is intended to be of interest to a small number of individuals is not broadcasted.

SUMMARY OF THE INVENTION

In one embodiment, the present invention discloses a method and an apparatus for providing media content using a mobile device serving as a media server. For example, the method discovers at least one target mobile device, and determines whether the at least one target mobile device is capable of supporting wireless streaming media. The method streams the media content to the at least one target mobile device using the mobile device if the at least one target mobile device is determined to be capable of supporting wireless streaming media.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing media content using a mobile device as a mobile media server over a network, e.g., an Internet Protocol (IP) network, an IP Multimedia Subsystem (IMS) network, a Voice over Internet Protocol (VoIP) network, a wireless network, and the like. Although the present invention is discussed below in the context of providing media content over an Internet Protocol (IP) Multimedia Subsystem (IMS) network, the present invention is not so limited. Namely, the present invention can be provided over packet networks in general, e.g., wireless networks, Voice over Internet Protocol (VoIP) networks, Service over Internet Protocol (SoIP) networks, and the like.

Figure 1:
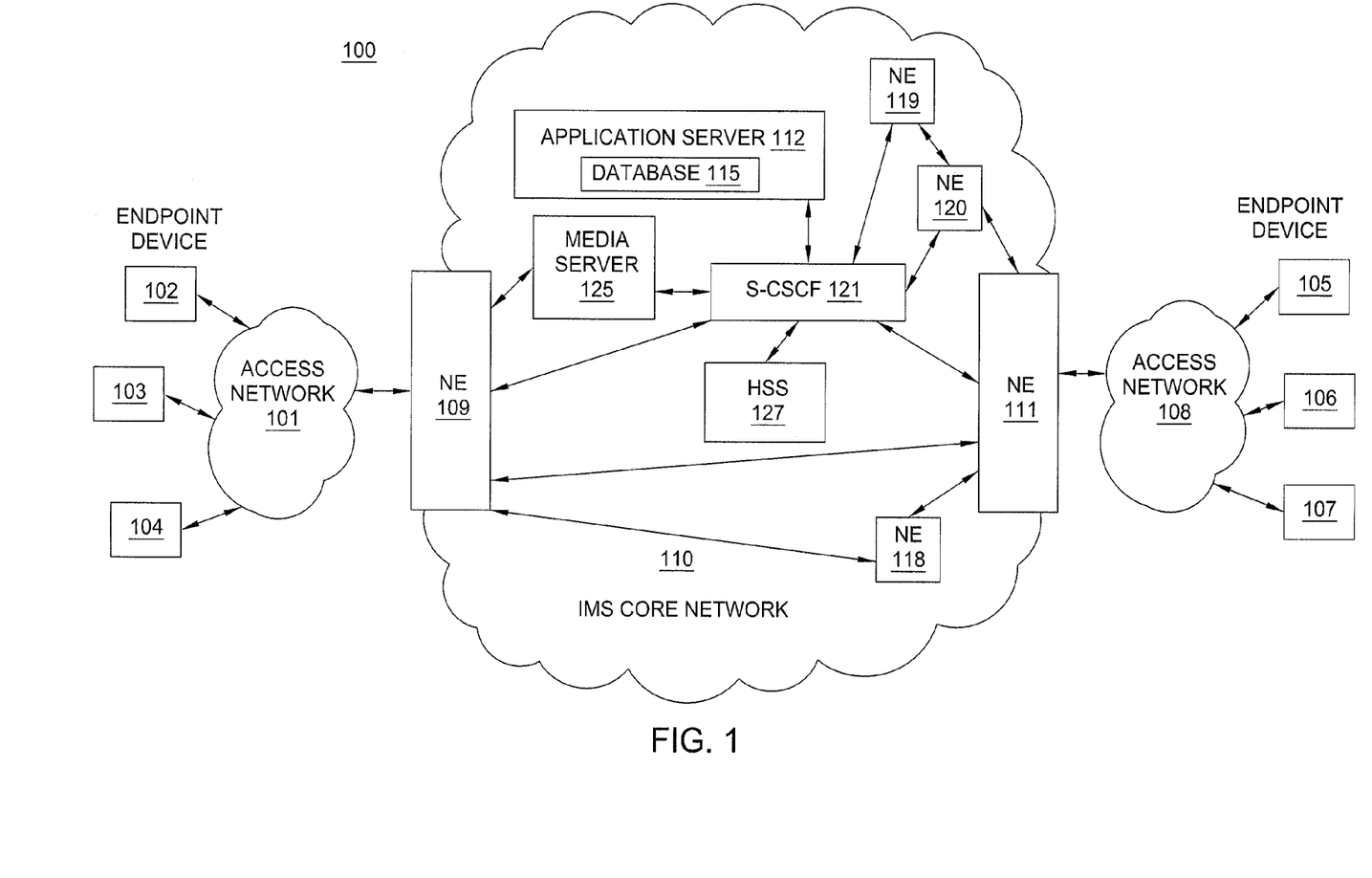
FIG. 1 illustrates an exemplary network related to the present invention.

To better understand the present invention, FIG. 1 illustrates an example network 100, e.g., an Internet Protocol (IP) Multimedia Subsystem network related to the present invention. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile phones, smart phones, and the like. The access networks 101 and 108 serve as a conduit to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a Media Server (MS) 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an IP address, and so on.

The Media Server (MS) 125 is a server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present invention. The above IP network is described only to provide an illustrative environment in which packets for voice, data and multimedia services are transmitted on IP Multimedia Subsystem (IMS) networks.

As discussed above, broadcast television operators typically send video content to be viewed by end users on several channels. The content in each channel is selected to be content that is deemed desirable for a large audience, e.g., millions of end users. However, content that an end user may desire to share with a few friends or family members is not deemed suitable for broadcasting or occupying a broadcast channel.

For example, an end user may wish to share media content that is already stored on the user's portable endpoint device, e.g., a mobile phone, a smart phone, a mobile multimedia device that can store video and audio files (e.g., an iPod®), etc. The media content may comprise one or more types of rich media content, e.g., video, audio, images, text, etc. In another example, a user may encounter media content and may wish to capture and share the content with friends or family. The media content can be acquired in a live setting via the mobile endpoint device, e.g., a cell phone's video capturing functions. It would be beneficial to allow the end user to stream the stored or recently captured content directly to the target devices to be viewed by friends and family. However, compatibility between the various devices may be an issue, such as streaming media capability may be available in one mobile device but not supported in another mobile device. For the purpose of the present disclosure, streaming media broadly encompasses the delivery method where multimedia are constantly received and presented to a user on a user device. In other words, the multimedia will be displayed as it is received, i.e., a user does not have to wait to download the entire file before the multimedia can be viewed. Thus, streaming media does not encompass the delivery method where the multimedia are completely received and then stored to be presented at a later time.

For example, mobile devices may have varying wireless streaming media capabilities. One mobile device may support wireless streaming media, whereas another mobile device has no such capability.

Furthermore, even if two mobile devices have streaming media capabilities, there may not be any common link between a source device holding the media content and a target device that others may be using to receive and/or view the media content stored on the source device. For example, the source device may use a different communication protocol from a communication protocol that is implemented in the target devices used for viewing by family members or friends. The source device is then unable to communicate with the target devices that are used for viewing multimedia provided via streaming media.

In one embodiment, the current method provides streaming media content using a mobile endpoint device (broadly a mobile device) as a media server. In one embodiment, the mobile endpoint device has the media content stored locally within the mobile endpoint device. In another embodiment, the mobile endpoint device has the ability to acquire the media content, e.g., via a local video capture function. In yet another embodiment, the mobile endpoint device may not have the media content, but it has an index that can be used to identify and communicate with one or more sources that are carrying the media content. In yet another embodiment, the mobile endpoint device may not have the media content stored locally, but is receiving the media content via streaming, and the mobile endpoint device can then relay (e.g., near real time) the received media content via streaming directly to the target devices.

In one embodiment, the mobile endpoint device is also able to automatically discover target devices that employ one or more different protocols, e.g., devices that use Bluetooth or Wi-Fi protocol. Bluetooth refers to an open wireless standard protocol for exchanging data over short distances from fixed and mobile devices. Wi-Fi refers to an IEEE 802.11 standard that uses the same radio frequencies as Bluetooth, but with higher power, resulting in a stronger connection. Once discovered, the mobile endpoint device will be able to transfer the media content directly to the target devices using a common protocol. In other words, in one embodiment, the mobile endpoint device will be able to transfer the media content directly to the target devices without the need to communicate over an access network, e.g., a wireless access network.

In one embodiment, the target device may not be capable of supporting streaming media. To address this deficiency, in one embodiment the target device is able to receive the media content through an intermediary media server that will handle the streaming media on behalf of the target device. For example, the intermediary media server receives the streaming media and then outputs the media content directly onto the target device in a delivery method that is supported by the target device, and it is the intermediary media server that will be discovered by the mobile endpoint device. For example, the intermediary media server is Bluetooth or Wi-Fi enabled but the device used for viewing may have only wire based connection to the intermediary media server.

In one embodiment, the current method also provides authentication of the source and/or target devices to facilitate secure exchange of media content. For example, the mobile endpoint device may support security authentication such that the transfer of media content is performed only to target devices that have permission to receive the media content.

In one embodiment, the current method provides authentication of a source or a target device on a session by session basis. For example, a device that had previously received a permission to receive the media content at one instance in time, may at a later time have the permission revoked. Thus, the method may then ensure the secure transfer of the media content after authentication on a session by session basis.

In one embodiment, the current method provides authentication of a source or a target device in a pre-determined time interval. For example, a device that had permission to receive media content may have its permission revoked after a pre-determined period of time. For example, there may be procedures for refreshing/renewing the authentication. If the procedures are not executed within a predefined time period, then the previously issued permission will be revoked.

In one embodiment, the current method allows a user to create firewalled content available to trusted parties. For example, since the mobile endpoint device may be connected into a virtual private network (VN) with authentication already in place, the user of the mobile endpoint device can access protected content on the mobile endpoint device and stream it out to other end point devices.

In one embodiment, the current method enables multiple mobile devices to collaboratively provide media content to a target output device. For example, two or more mobile devices may output media content onto the same target output device to enable viewing of multiple media content collaboratively. For example, two or more mobile phones may output media content onto the same target device to enable the viewing of the content received from both mobile phones, e.g., one mobile phone provides an audio file, while the other mobile phone provides a video file such that the audio file is used to provide the audio signal for the video. Alternatively, one mobile phone may be capturing images of traffic taken at a first entrance, whereas another mobile phone may be capturing images of traffic taken at a second entrance such that images of both entrances are received and displayed by the target device, e.g., in a split screen format.

Figure 2:
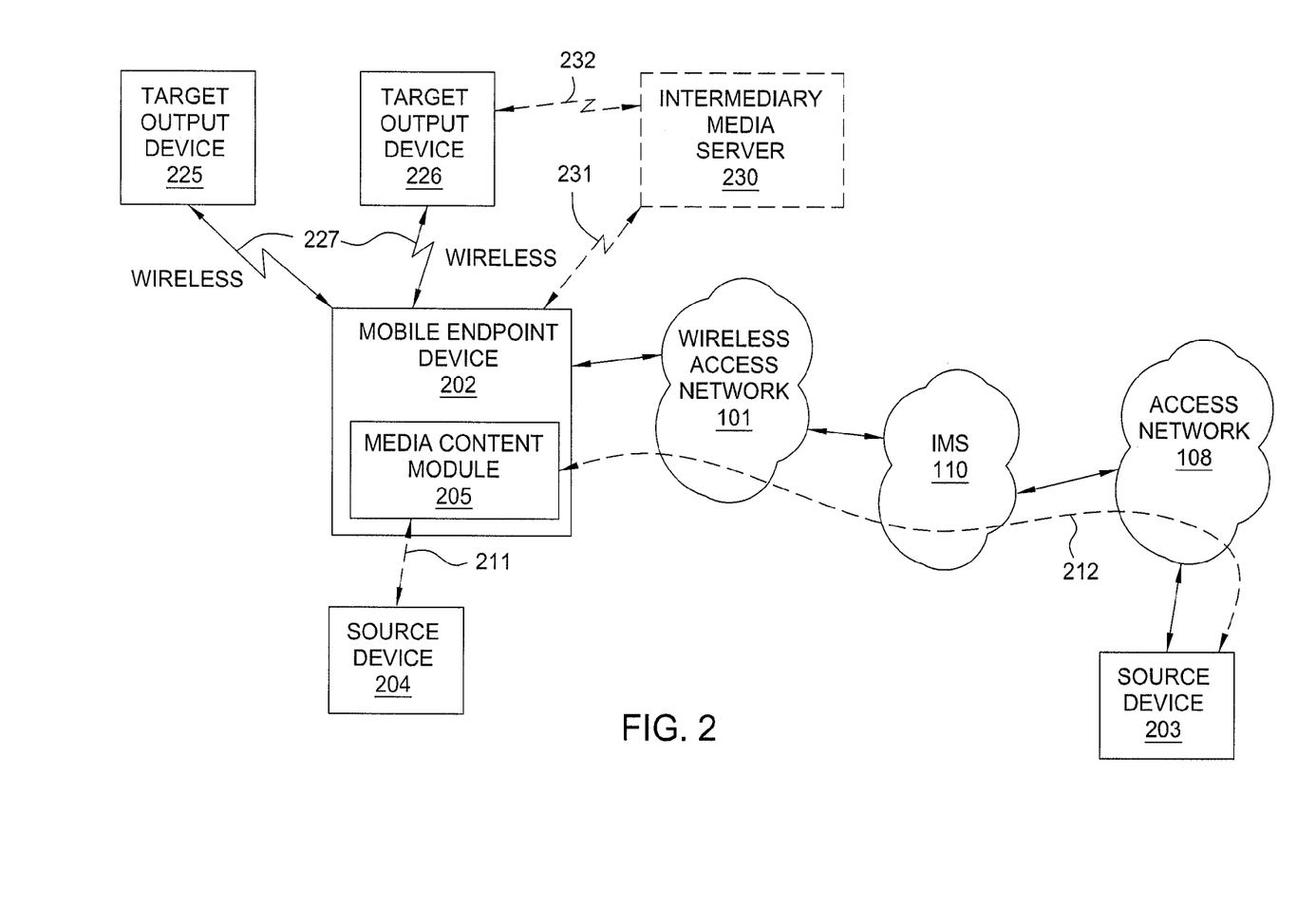
FIG. 2 illustrates an exemplary network in accordance with one embodiment of the current invention for providing media content using a mobile device as a media server.

FIG. 2 illustrates an exemplary network 200 in accordance with one embodiment of the current invention for providing media content using a mobile device as a media server. In one embodiment, the network 200 comprises a mobile endpoint device 202 communicating with an IMS network 110 via a wireless access network 101. The mobile endpoint device 202 also communicates with target output devices (broadly target mobile devices) 225 and 226. In one embodiment, the communication between the mobile endpoint device 202 and the target output device 225 and/or 226 is via wireless connections 227. Optionally, the communication between the mobile endpoint device 202 and the target device 226 may be through an intermediary media server 230 and wireless connections 231 and 232.

In one embodiment, the mobile endpoint device 202 may communicate with source devices 203 and 204. For example, the communication with the source device 204 can be a local wireless or wire based communication. The communication with the source device 203 is via the IMS network 110 and access networks 101 and 108.

In one embodiment, the mobile endpoint device 202 comprises a media content module 205 that is tasked with the storage and distribution of media content. For example, the media content module 205 can be used to provide media content stored in the mobile endpoint device that was loaded locally by a user of the mobile endpoint device. In another example, the media content module 205 may have received the media content from a source device 203 or 204, for distribution to the target output devices 225 and 226. In another example, the media content module 205 may not receive the actual media content, but it may have information pertaining to the location of the media content. If the media content module has the location information but not the actual media content, the media content module will facilitate the transfer of the media content between the source device and one or more target output devices. It should be noted that mobile endpoint device 202 may comprise numerous input/output devices such as a controller, a transmitter, a receiver, an antenna, a memory, a display, user interfaces such as key pads, input ports, output ports and the like that are not shown in FIG. 2. These input/output devices are broadly disclosed with reference to FIG. 4 below.

In one embodiment, the mobile endpoint device 202 discovers one or more target output devices. For example, the method may be providing viewing via target devices 225 and 226, which may be physically located in various locations. The method then determines if the one or more target output devices are capable of wireless streaming media. If the one or more target devices are capable of wireless streaming media, the method then identifies a common protocol to provide the wireless streaming media. For example, if the target output devices 225 and 226 support the Bluetooth protocol, then the mobile endpoint device 202 will transmit the media content to the target output devices 225 and 226 using the Bluetooth protocol. Thus, the method transmits the media content using an identified common protocol. It should be noted that the selected protocol can be negotiated between the devices. In other words, if the mobile endpoint device and the target output device support multiple types of protocols, then the devices themselves will negotiate which protocol to use, e.g., using a faster communication protocol versus a slower communication protocol, using a newer version of a communication protocol, using a more efficient protocol, using a more robust communication protocol in a noisy environment and so on. It should be noted that the target output devices can also be displays, e.g., a television, a laptop and the like. In other words, in one embodiment, the target output device does not have to be a communication device such as a mobile phone.

If the one or more target output devices are not capable of wireless streaming media, then an intermediary media server will be used. For example, if the target output device 226 is not capable of wireless media streaming, the method may provide the media content to the target output device 226 via the intermediary media server 230.

Figure 3:
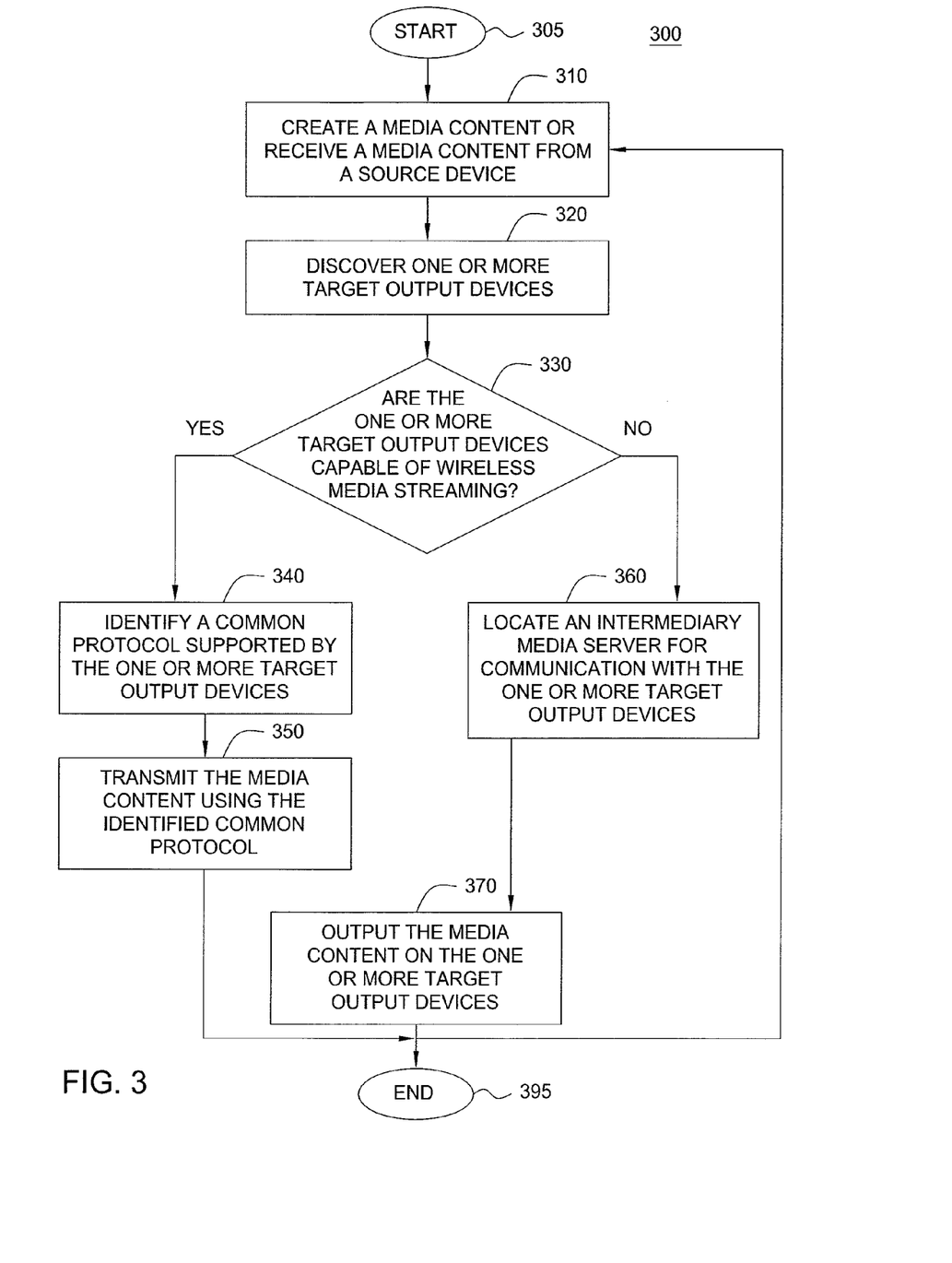
FIG. 3 illustrates a flowchart of a method for providing media content using a mobile device as a media server.

FIG. 3 illustrates a flowchart of a method 300 for providing a media content using a mobile device as a media server. For example, one or more steps of method 300 can be implemented in a mobile endpoint device. Method 300 starts in step 305 and proceeds to step 310.

In step 310, method 300 creates media content or receives media content from a source device. For example, the mobile endpoint device may acquire the media content by taking a video, or alternatively receive the media content from a source device, e.g., a server.

In step 320, method 300 discovers one or more target output devices. The target devices can be selected by the user of the mobile endpoint device 202, e.g., via a list of device identifications, such as addresses, phone numbers and the like. For example, the method may be providing streaming media viewing to target devices that support one or more wireless protocols, e.g., Bluetooth protocol. The method may then detect signals from the target output devices using one or more protocols. Target output devices matching the identifications listed by the user will be deemed to be discovered for receiving streaming media. As discussed above, authentication can be performed before each discovered device will be granted permission to receive the media content. For example, permission can be given in the form of a password, a key, or any other mechanism that is used to process the received media content, e.g., the media content can be encrypted or protected.

In step 330, method 300 determines if the one or more target output devices are capable of wireless streaming media. For example, the target output devices may not support streaming functionality. If the one or more target devices are capable of wireless streaming media, the method proceeds to step 340. Otherwise the method proceeds to step 360.

In step 340, method 300 identifies a common protocol supported by the one or more target output devices that is capable of supporting wireless streaming media. For example, the one or more target output devices may support the Bluetooth protocol. In another example, the one or more target output devices may support the Wi-Fi protocol. It should be noted that the present invention is not limited to any particular communication protocols. The method then proceeds to step 350.

In step 350, method 300 transmits the media content using the identified common protocol. For example, the mobile endpoint device will stream the media content to the target output devices using the identified common protocol. The method then proceeds to step 370.

In step 360, method 300 locates an intermediary media server for communicating with the one or more target output devices that are not capable of wireless streaming media. For example, an intermediary media server may be needed for streaming to target output devices that lack the streaming capability. The method then proceeds to step 370.

In step 370, method 300 outputs the media content to the one or more target output devices via the intermediary media server. For example, the media content is streamed for viewing via the intermediary media server for target output devices that lack the streaming capability. The method then proceeds to step 395 to end processing the current media content, or to step 310 to continue creating or receiving more media content.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
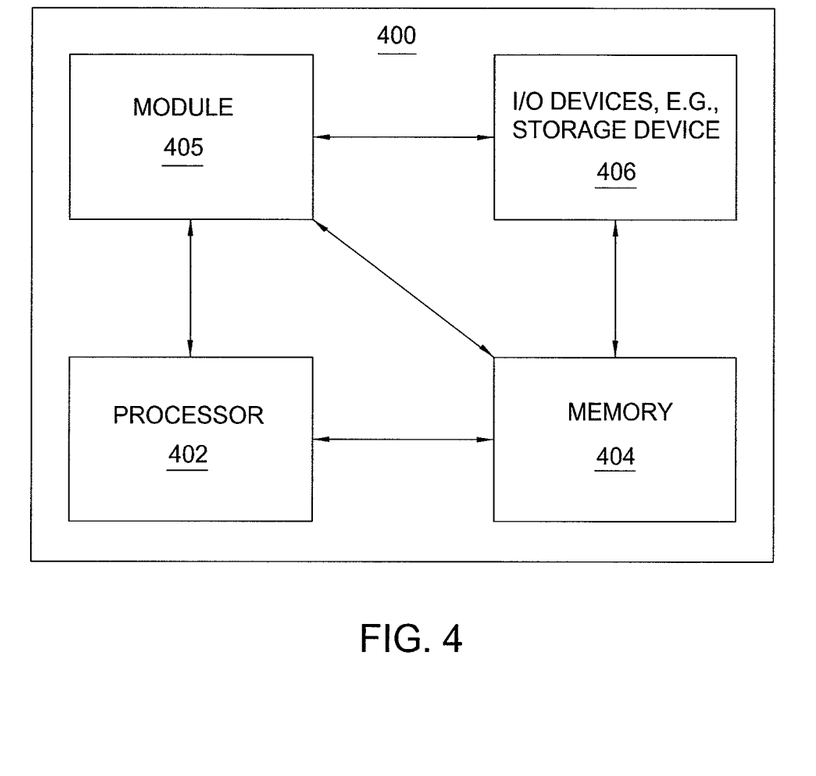
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing media content using a mobile device as a media server, and various input/output devices 406 (e.g., storage devices, including but not limited to, a tape drive, a floppy drive, a hard disk drive or a compact disk drive, a receiver, a transmitter, an antenna, a speaker, a display, a speech synthesizer, an output port, an input port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing media content using a mobile device as a media server can be loaded into memory 404 and executed by processor 402 to implement the functions as discussed above. As such, the present method 405 for providing media content using a mobile device as a media server (including associated data structures) of the present invention can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing media content, comprising:
    discovering, by a mobile device comprising a processor, a target mobile device, wherein the discovering comprises authenticating of the target mobile device on a session by session basis such that the media content is only provided to the target mobile device having a permission to receive the media content;
    determining, by the mobile device, whether the target mobile device is capable of supporting wireless streaming media;
    identifying, by the mobile device, a common protocol supported by the mobile device and the target mobile device for the supporting the wireless streaming media, wherein the common protocol is identified by selecting a fastest communication protocol that is supported by both the mobile device and the target mobile device from among a plurality of protocols that is supported by both the mobile device and the target mobile device;
    streaming, by the mobile device, the media content to the target mobile device, directly without communicating over an access network, if the target mobile device is determined to be capable of supporting wireless streaming media, wherein the streaming enables a portion of the media content to be viewed on the target mobile device before the entire media content is delivered to the target mobile device; and
    locating, by the mobile device, an intermediary media server for the target mobile device, when the target mobile device is determined to be incapable of supporting wireless streaming media, wherein the streaming is provided to the intermediary media server for outputting the media content onto the target device in a delivery method that is supported by the target mobile device, wherein the intermediary media server and the target mobile device are connected via a wire based connection.

2. The method of claim 1, wherein the common protocol comprises a bluetooth protocol, wherein the common protocol enables direct communication between the target mobile device and the mobile device.

3. The method of claim 1, wherein the authentication is performed in a pre-determined time interval.

4. The method of claim 1, wherein the media content is initially received by the mobile device via streaming.

5. A non-transitory computer-readable storage medium storing a plurality of instructions which, when executed by a processor of a mobile device, cause the processor to perform operations for providing media content, the operations comprising:
    discovering a target mobile device, wherein the discovering comprises authenticating of the target mobile device on a session by session basis such that the media content is only provided to the target mobile device having a permission to receive the media content;
    determining whether the target mobile device is capable of supporting wireless streaming media;
    identifying a common protocol supported by the mobile device and the target mobile device for the supporting the wireless streaming media, wherein the common protocol is identified by selecting a fastest communication protocol that is supported by both the mobile device and the target mobile device from among a plurality of protocols that is supported by both the mobile device and the target mobile device;
    streaming the media content to the target mobile device directly without communicating over an access network, if the target mobile device is determined to be capable of supporting wireless streaming media, wherein the streaming enables a portion of the media content to be viewed on the target mobile device before the entire media content is delivered to the target mobile device; and locating an intermediary media server for the target mobile device, when the target mobile device is determined to be incapable of supporting wireless streaming media, wherein the streaming is provided to the intermediary media server for outputting the media content onto the target device in a delivery method that is supported by the target mobile device, wherein the intermediary media server and the target mobile device are connected via a wire based connection.

6. The non-transitory computer-readable storage medium of claim 5, wherein the common protocol comprises a bluetooth protocol, wherein the common protocol enables direct communication between the target mobile device and the mobile device.

7. The non-transitory computer-readable storage medium of claim 5, wherein the authentication is performed in a pre-determined time interval.

8. The non-transitory computer-readable storage medium of claim 5, wherein the media content is initially received by the mobile device via streaming.

9. A mobile device for providing media content, comprising:
a processor; and
a computer-readable medium storing a plurality of instructions which, when executed by the processor, cause the processor to perform operations, the operations comprising:

discovering a target mobile device, wherein the discovering comprises authenticating of the target mobile device on a session by session basis such that the media content is only provided to the target mobile device having a permission to receive the media content;

determining whether the target mobile device is capable of supporting wireless streaming media;

identifying a common protocol supported by the mobile device and the target mobile device for the supporting the wireless streaming media, wherein the common protocol is identified by selecting a fastest communication protocol that is supported by both the mobile device and the target mobile device from among a plurality of protocols that is supported by both the mobile device and the target mobile device;

streaming the media content to the target mobile device directly without communicating over an access network, if the target mobile device is determined to be capable of supporting wireless streaming media, wherein the media content that is streamed enables a portion of the media content to be viewed on the target mobile device before the entire media content is delivered to the target mobile device; and locating an intermediary media server for the target mobile device, when the target mobile device is determined to be incapable of supporting wireless streaming media, wherein the streaming is provided to the intermediary media server for outputting the media content onto the target device in a delivery method that is supported by the target mobile device, wherein the intermediary media server and the target mobile device are connected via a wire based connection.

* * * * *